United States Patent [19]

Craig

[11] Patent Number: 4,946,599

[45] Date of Patent: Aug. 7, 1990

[54] APPARATUS AND METHOD FOR CONVERTING BOTTLED WATER DISPENSERS TO CONTINUOUS SUPPLY SYSTEMS

[75] Inventor: Thomas L. Craig, 1015 Grove St., Avoca, Pa. 18641

[73] Assignees: Thomas L. Craig, Avoca; Thomas J. Carroll, Taylor, both of Pa.

[21] Appl. No.: 274,025

[22] Filed: Nov. 21, 1988

[51] Int. Cl.⁵ ............................................. C02F 1/00
[52] U.S. Cl. ........................................... 210/741; 210/774; 210/137; 210/175; 210/289; 210/291; 210/474; 239/24; 239/25; 62/389; 62/397; 222/146.1
[58] Field of Search ............... 210/741, 282, 289, 287, 210/291, 292, 266, 510.1, 137, 774, 290, 175, 474; 239/24, 25; 62/389, 397; 222/146.1

[56] References Cited

U.S. PATENT DOCUMENTS

| | | | |
|---|---|---|---|
| 1,579,158 | 3/1968 | Smilie | 210/291 |
| 2,022,164 | 11/1935 | Sweetland | 62/339 |
| 2,335,458 | 11/1943 | Senyal | 210/474 |
| 2,623,367 | 12/1952 | Morrison | 62/339 |
| 2,767,960 | 10/1956 | Fast | 62/397 |
| 3,035,418 | 5/1962 | Wright | 62/389 |
| 3,269,143 | 8/1966 | Gasparovich | 62/389 |
| 3,456,803 | 7/1969 | Rak | 210/177 |
| 3,468,370 | 4/1969 | Castillo | 62/389 |
| 3,511,415 | 5/1970 | Crowe | 222/146.1 |
| 3,541,808 | 11/1970 | Materese | 62/397 |
| 3,688,950 | 9/1972 | Parish | 62/397 |
| 3,824,801 | 7/1974 | Laudato, Jr. | 62/397 |
| 3,982,406 | 9/1976 | Hansen et al. | 62/339 |
| 4,145,291 | 3/1979 | Console et al. | 210/474 |
| 4,158,629 | 6/1979 | Sawyer | 210/321.67 |
| 4,207,994 | 6/1980 | Oflee, Sr. | 62/393 |
| 4,322,291 | 3/1982 | Ho | 210/287 |
| 4,571,953 | 2/1986 | Caruso | 62/339 |
| 4,599,166 | 7/1986 | Gesslauer | 210/177 |
| 4,711,723 | 12/1987 | Bray | 210/266 |
| 4,753,728 | 6/1988 | VanderBilt et al. | 210/282 |
| 4,792,059 | 12/1988 | Kerner et al. | 222/146.1 |

Primary Examiner—Richard V. Fisher
Assistant Examiner—Cynthia L. Nessler
Attorney, Agent, or Firm—Woodcock Washburn Kurtz Mackiewicz & Norris

[57] ABSTRACT

Apparatus and methods for converting a bottled water dispenser for use with a continuous source of water are disclosed. In a preferred embodiment, means for reducing the pressure and filtering the continuous source of water are provided. In a most preferred embodiment, the apparatus is configured to substantially reside within the existing dispenser apparatus, thus eliminating the need for bottled water. A housing is provided which contains a filter in an upper portion thereof, the lower portion shaped to conform to an existing tank within the bottled water dispenser in order to provide good thermal communication between the apparatus of the present invention and the existing refrigeration means. Chilled water is retained in the lower portion of the housing and is filtered upon demand, thus providing freshly filtered water to the user at a pressure and velocity substantially the same as that produced using a bottled source, without the contaminants expense and inconvenience associated with bottled water. Also provided are methods and apparatus for converting bottled water dispensers having means for dispensing heated water for use with a continuous source of water.

19 Claims, 2 Drawing Sheets

APPARATUS AND METHOD FOR CONVERTING BOTTLED WATER DISPENSERS TO CONTINUOUS SUPPLY SYSTEMS

The present invention relates to novel apparatus and methods for converting a bottled water dispenser to a continuous dispenser of chilled, purified water. More specifically, the present invention provides methods an apparatus whereby a conventional bottled water dispenser is provided with a filter, housing and other apparatus thereby eliminating the us of bottles and providing water of a higher purity than provided by bottled sources.

BACKGROUND OF THE INVENTION

It has been recognized that there is extensive pollution of groundwater throughout the United States. This contamination has many sources, such as industrial waste, agricultural chemical leachates, acid rain, and roadway runoff. Thus, it is generally believed that the water provided by many wells and municipal water systems is contaminated. As a result of this belief, many businesses, schools and homes utilize bottled water for drinking and cooking. Reliance upon bottled water as a source of potable water is, however, misplaced. Despite attractive labeling, 70 percent of the bottled water in the U.S. is actually obtained from municipal sources and reprocessed. Since the standards for bottled water are no more stringent and no more rigorously enforced than those for tap water, there is no assurance that bottled water is any more free from contamination than tap water. Bottled water is usually produced by exposing source water to high temperatures, thus allowing most impurities to boil or evaporate off. See, "Bottled Water—Not What You Think", CBE Environmental Review, March/April 1984.

In some instances the production of bottled water involves filtration processes. These typically remove only the some particulate matter—a large quantity of contaminates remain. Furthermore, the filtration processes does not destroy bacteria; in fact, during the sometimes extensive period after filtration and before consumption, the bacterial content of bottled water actually increases. Because it is known that bottled water contains contaminates and bacteria, some state and governmental authorities are considering regulations which require a label be affixed to bottled water which would advise the consumer that it is merely filtered tap water. See, e.g., "Bottled Water and Vended Water: Are Consumers Getting Their Money's Worth?", Assembly, California Legislature, Assembly Office of Research 061-A (1985).

Bottled water is also very expensive. Studies have suggested that bottled water may be 1000 times more expensive than water delivered from the tap. See "Bottled Water and Vended Water", referenced above. This extraordinary increase arises form the expenses associated with filtration, bottling, and storage, delivery and retrieval of the bottles themselves. The disadvantages of bottled water have been recognized by others. For example, U.S. Pat. No. 3,688,950—Parish provides a device which allows a lightweight collapsible bag to be used to replace the bottle portion of a typical bottled water dispenser.

Despite these obvious shortcomings, many consumers prefer bottled water and utilize a bottled water dispenser. Bottled water dispensers include a refrigeration system for chilling the bottled water and frequently include a heater which allows hot water to be dispensed as well. Typical bottled water dispensers do not include drains and are not connected to a source of water, such as an inlet from a municipal water system, since the bottle acts as a water source.

Many types of filtration apparatus are known, for example, granular charcoal filters, silver-granular charcoal filters, ion exchange systems, distillation apparatus, and reverse osmosis equipment. Although each of these filters, in certain embodiments, may provide water of a higher purity than bottled water, each suffers from certain limitations. See, Purus, Ltd., P.O. Box 175, Avoca, Pa. 18641, informational brochure (1988). It has been found that a filter utilizing a solid carbon block filter substantially improves the quality of filtered water, compared with other filters. This improvement is due largely to the unfiltered water being forced through the sub-micron pores of the carbon compound. The water is thus strained to remove sub-micron sized particles, a substantial improvement over, for example, granulated charcoal media. A carbon block filter cartridge may also comprise other filter stages such as a cotton cellulose stage or an activated carbon/cellulose/-polyethylene stage, which to remove larger particles, colloids, bacteria and other pollutants before the carbon block filter is reached. A filter combining these stages has been shown to be a more effective than those listed above, and accordingly, provides water which is of a much higher purity than the average bottled water source. See, Purus Ltd., technical data handbook.

Previously, efforts have been largely concentrated on providing "stand alone" apparatus for chilling and dispensing water from a continuous source such as a well or a municipal system. In some instances a filter of some type to purify the water is also provided. Examples of such devices are U.S. Pat. Nos. 2,022,164—Sweetland (porcelain filter element); 2,623,367—Morrison (charcoal filter); 3,456,803—Rak (reverse osmosis filter unit); 3,982,406—Hanson (activated granular charcoal); 4,207,994—Offlee (zeolite exchange unit); 4,599,166—Gesslauer (ozone filter).

In fact, patents issued in the last few years demonstrate that a need continues to exist for an independent system capable of dispensing chilled and purified water, as seen for example, in U.S. Pat. No. 4,571,953—Caruso. Although Caruso recognizes and attempts to solve the problems associated with unwieldy water bottles, the solution offered involves an entirely new piece of equipment. (see col. 1, lines 24–35). However, as pointed out by Parish, it would be desirable to provide an alternative to water bottles without disturbing the capital investment bottled water dispenser owners have made in their machines. (see col. 1, lines 1–46). Accordingly, it can be seen that there exists a long felt, yet unsolved need for a system which provides chilled, purified drinking water for use by businesses and other applications, preferably eliminating the need to buy bottled water, but retaining a viable use for the hundreds of thousands of existing bottled water dispensing units.

OBJECTS OF THE INVENTION

It would be desirable to provide filtered water which is substantially purified in comparison to water provided by wells, municipal systems or bottled water. Accordingly, it is an object of the present invention to provide purified water upon consumer demand, in either a chilled or heated state, such water being largely free from the contaminates found in wells, municipal systems and bottled water sources.

It further would be desirable to eliminate the expenses associated with the production and delivery of bottled water and to retain a cost effective use for existing bottled water dispensers. Therefore, it is another object of the present invention to allow consumers to modify existing bottled water dispensers to eliminate the need for bottled water and to provide purified water using existing dispensers.

SUMMARY OF THE INVENTION

These and other objects of the present invention are fulfilled by converting apparatus for dispensing bottled water to utilize a continuous water source. The bottled water dispenser has a holding tank, means for chilling water in a thermal relationship with the tank, and spigot means for controlling the flow of the chilled water which may be operated to provide chilled water upon demand. Since a continuous water source pressure head typically ranges between about 60 and 120 pounds per square inch, the continuous source is first connected to a means for reducing the pressure head of the source to a pressure of less than about 40 pounds per square inch, which is substantially the same pressure produced by a typical bottled source. The reduced-pressure water is then delivered to a housing which is disposed within the existing holding tank and is in a thermal relationship with the tank, and thus with the refrigeration means. A portion of the housing acts as a holding chamber means and retains a volume of chilled water. Also disposed within the housing is a means for filtering water. Upon demand the chilled water is filtered and delivered to a spigot. In certain embodiments, the present invention also includes apparatus to connect the means for heating water and means for controlling the flow of heated water included in some bottled water dispensers to the outlet of the filter, thereby providing heated, purified water upon demand.

In a preferred embodiment, the present invention provides apparatus for converting a bottled water dispenser for use with a continuous source of water such as a well system or municipal water line. The means for filtering water is preferably comprised of a housing containing activated charcoal filter media and inlet and outlet connections whereby, the inlet connection admits water to the holding chamber portion of the housing, upon demand, the chilled water flows through the charcoal filter media, and chilled, filtered water exits through the outlet connection. In a most preferred embodiment, the means for filtering the water is configured to substantially replace the bottle portion of a commercial bottled water dispenser.

DETAILED DESCRIPTION

Figure 1:
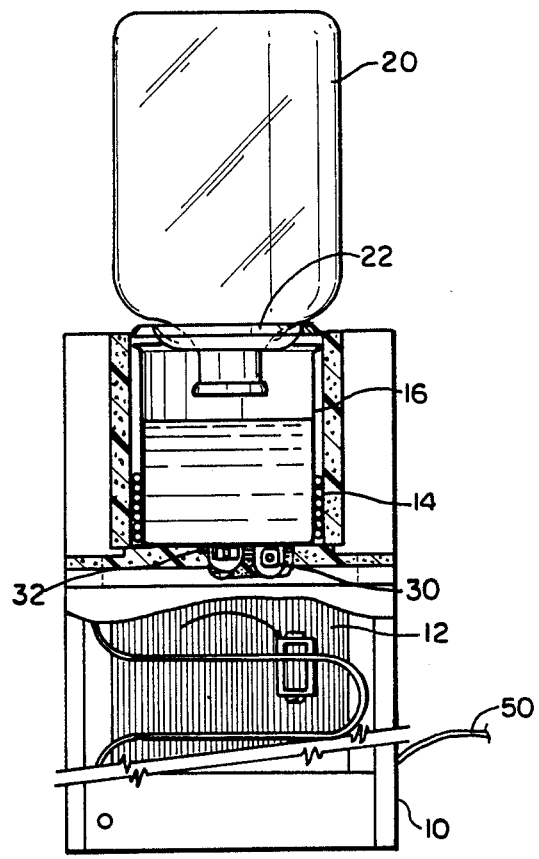
FIG. 1 is a partially cut away rear elevation of a typical prior art bottled water dispenser.

Referring now to FIG. 1, there is illustrated a water dispenser, of the type generally available for use in offices, factories and the home. The dispenser unit 10 generally has a water bottle 20 mounted on its top. This arrangement provides a source of water at ambient temperature having a pressure head which is simply the hydraulic head of the column of water remaining in the bottle 20—typically about 40 pounds per square inch (psi). It will be appreciated that although the appearance, construction and features of the numerous models of dispenser apparatus 10 differ in many respects, the size and shape of the water bottle opening 22 is substantially standardized. In FIG. 1, the refrigeration apparatus 12 contained within the bottled water dispenser 10 are also shown. One of ordinary skill will appreciate that the apparatus illustrated are merely representative examples of typical devices and that certain dispensers may contain more or less equipment for performing the same function.

Water from the bottle 20 is normally allowed to collect in a tank 16, the upper portion of which is configured to accept a water bottle, the lower half of which is in thermal communication with the coils 14 of the refrigeration apparatus 12. After the water has been chilled, a connection 30 is provided for an outlet tube or other means for connecting the chilled water to a dispensing spigot not visible in this view.

Similarly, certain embodiments of bottled water dispensers also provide heated water. Some of the apparatus for such an embodiment is visible in FIG. 1. Water is provided from the tank 16 via a connection 32 to a heater means (not shown). The heated water is then transferred to a tap. It will be appreciated that both the chilling apparatus 12 and the heating apparatus are provided with electric power via a cable 50.

Figure 2:
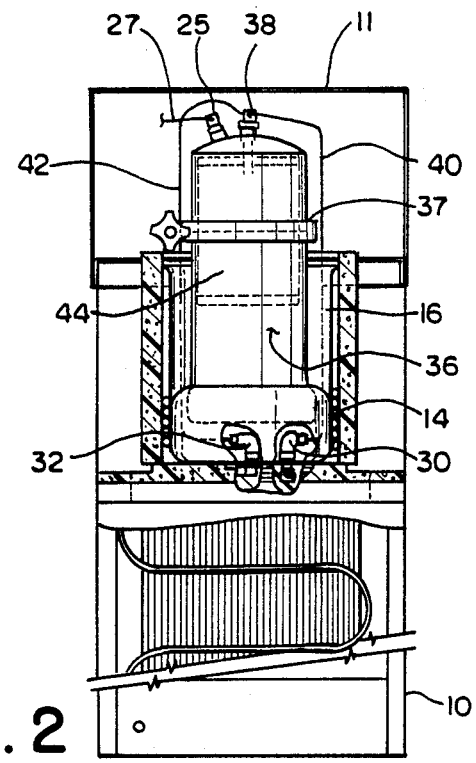
FIG. 2 is a partially cutaway rear elevation of the apparatus of the present invention, used in conjunction with the apparatus of FIG. 1.

Referring now to FIG. 2, there is illustrated a preserred embodiment of the apparatus of the present invention. As described above with reference to FIG. 1, a bottled water dispenser 10 is converted to apparatus for continuously supplying purified water by replacing the water bottle with a housing 36, which contains a filter element 44.

Figure 3:
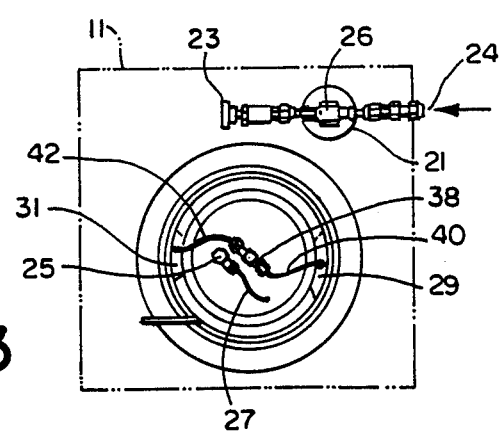
FIG. 3 is a plan view of the apparatus of FIG. 2.

As seen in FIG. 3, in order to provide a continuous source of water, a water line 24 is connected to a means for regulating pressure 26. It will be appreciated that several apparatus are available to accomplish this function. Also, it may be desirable in certain instance to raise the pressure of the inlet water, however, in most circumstances the pressure will be lowered. Typically, municipal or residential water systems provide water at a pressure between about 60-120 pounds per square inch (psi). In order to function as designed, it is necessary to provide the bottled water dispenser apparatus 10 with a source of water having approximately the same pressure as that developed by a water bottle—about 40 psi. Therefore, the pressure of the continuous inlet 24 will typically be lowered. In a preferred embodiment, as illustrated in FIG. 3, the pressure regulator 26 is provided with an adjusting knob 23 and a pressure gauge 21, which indicates the output pressure of the regulator 26. As discussed above with reference to FIG. 1, water dispensers constructed in accordance with certain embodiments of the present invention will comprise apparatus for delivering heated water as well as chilled water. Typically, as explained above, a hot water connection 32 is provided to permit water to flow from the tank 16 to a heater means (not shown). Thus, in embodiments which provide heated, purified water, the present invention comprises apparatus for connecting a means for heating water to a means for controlling the flow of heated water to the outlet of the filter element 44. By manipulating the adjusting knob 23, the regulator output pressure is adjusted to the desired pressure, preferably about 40 psi. The output of the pressure regulator 26 is connected via a tube 27 to an inlet fitting 25. In a preferred embodiment, the pressure regulator 26 is contained within a cover 11 and is flexibly connected to the housing, thereby allowing the cover 11 to be removed without disconnecting the regulator 26 from the housing 36.

Referring now to FIG. 2, it can be seen that an inlet fitting 25 introduces water into the interior of the housing 36. The housing 36 contains a filter 44. In a preferred embodiment, the filter 44 is disposed within the upper portion of the housing 36 and is comprised of an activated solid carbon block. Other filter media and apparatus may be substituted depending upon availability, effectiveness, and the particular pollutants sought to be eliminated, etc. The present invention is not limited to the filter apparatus illustrated, indeed, there are numerous filter apparatus available which may be adapted to reside, wholly or partly within a housing similar to that illustrated. The housing 36, in turn, is disposed within the cold water tank 16 of an existing bottled water dispenser 10.

The lower portion of the housing 36 is somewhat larger than the upper portion and is constructed to act as a holding chamber. The holding chamber is in thermal communication with the tank 16 and thus with the coils 14 of the bottled water dispenser. The introduced water which has collected in the lower portion of the housing 36 is thereby chilled. It will be appreciated that the housing is shaped and dimensioned so as to make efficient use of the space afforded by the water tank 52, which is now empty due to the elimination of the water bottle. In a preferred embodiment, the housing 36 is comprised of two pieces, joined by a fitting 37, which provides a watertight pressure seal between the two pieces. Using a two piece construction provides the ability to replace the filter element 44 as needed without draining or otherwise more fully disassembling the present invention, since the filter element 44 is preferably disposed in the upper portion of the housing 36.

Figure 4:
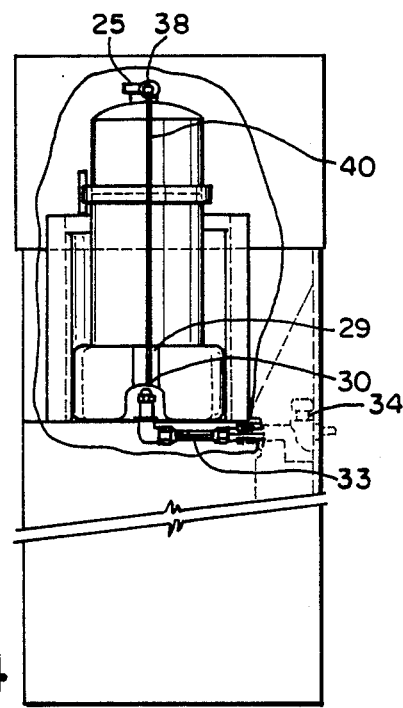
FIG. 4 is a partially cut away side elevation of the apparatus of FIG. 2.

Upon demand, chilled water flows through the filter 44 to an outlet 38. By purifying water upon demand, the present invention prevents any bacterial growth, mineral transfer, or other contamination related to the apparatus, thus providing the purest possible water directly to the user. Since the water within the lower portion of the housing 36 is pressurized, the outlet 38 may preferably be located on the top of the upper portion of the housing. The outlet 38 is in the form of a "Tee" junction in order to provide separate cold and hot water lines, 40 and 42 respectively. One of ordinary skill will realize that the hot water line 42, in certain embodiments, may be omitted. The cold and hot water lines 40, 42 are routed along the sides of the housing 36. The reduced cross-sectional area of the housing 36 in the region above the cooling coils allows the lines 40, 42 to pass unobstructed along its sides. Upon reaching the enlarged portion of the housing 36, the lines 40, 42 are routed through depressions 29, 31 formed in the side of the tank, as shown in FIG. 3. Referring again to FIG. 2, it can be seen that the lines 40, 42 continue beneath the housing 36 and connect to cold water fitting 30 and hot water fitting 32 respectively. Referring to FIG. 4, it can be more clearly seen that these fittings 30, 32 reside in a depression in the bottom of the housing 36, thus allowing unobstructed routing of the lines 40, 42. One of ordinary skill will appreciate that numerous other routing paths and arrangements of the depressions and the like other than that described and illustrated herein may be designed to achieve the same result.

Other embodiments of the present invention, for reasons dependent upon the particular construction of the bottled water dispenser 10 may find other configurations, such as placing the inlet 25 or the outlet 38 on the side of the housing, offer certain advantages.

Referring now to FIG. 4, the cold fitting 30 is connected to an output tube 33, which is connected to a spigot 34. Similar connections, not illustrated, are provided for the hot fitting 32, which may be connected to a spigot similar to the spigot illustrated 34, or may share the same spigot 34 with the cold water.

Referring to FIGS. 2 and 3, the regulator apparatus is attached to and may be configured to be retained within a cover 11, which is provided to fit over the bottled water dispenser cabinet. The connection 27 between the output of the pressure regulator 26 and the inlet 25 is preferably comprised of a length of flexible tubing or hose, which allows the cover to be removed without disconnecting the inlet line 27, in order to facilitate maintenance and adjustment.

Although certain embodiments have been described with particularity, of the present invention is not limited to these embodiments. As set forth in the appended claims, other embodiments of the present invention are also contemplated within the scope of the present invention.

What is claimed is:

1. Apparatus for converting a bottled water dispenser to receive water from a continuous source in lieu of a bottled source, said dispenser being of the type having a water tank, said tank being in thermal relationship with refrigeration means and connected to an output tube which is terminated by a spigot, whereby chilled water is dispensed upon demand, said conversion apparatus comprising:
    (a) regulator means for controlling the input pressure from the continuous water source, said regulator means further having an output;
    (b) a housing, constructed to fit within said tank as an integral unit, said housing comprising:
        (i) inlet means for receiving water from the output of said regulator means;
        (ii) holding chamber means for retaining a volume of chilled water, in thermal relationship with said tank;
        (iii) filter means, substantially disposed within said housing, for purifying the chilled water in said holding chamber upon demand;
        (iv) outlet means for connecting said housing to said output tube of said bottled water dispenser, whereby, water from said output of said regulator means is introduced into said housing and chilled, the chilled water being thereafter introduced into said filter means, said filter means providing chilled, purified water at a flow rate sufficient to fulfill the demand created by opening said spigot and at substantially the same pressure and velocity as provided by a bottled source.

2. The apparatus of claim 1, wherein the output of said regulator means is of a size which provides water at a pressure substantially equal to the output pressure of a typical bottled source.

3. The apparatus of claim 1, wherein said regulator means is of a type which reduces the pressure of said continuous source to a lower pressure.

4. The apparatus of claim 1, wherein said regulator means is of a size and type which reduces the pressure of said continuous source from between about 60 to 120 pounds per square inch to less than about 40 pounds per square inch.

5. The apparatus of claim 1, wherein said housing provides a substantially watertight connection between therefor; said output of said regulator means and said output tube.

6. The apparatus of claim 1, wherein said filter means comprises activated charcoal.

7. The apparatus of claim 1, wherein said filter means comprises a cartridge filter.

8. The apparatus of claim 1, wherein said filter means comprises a substantially solid, porous filter media.

9. The apparatus of claim 1, wherein said bottled water dispenser further comprises heater means for raising the temperature of water; heater output tube means which is terminated by a spigot, whereby heated water is dispensed upon demand, said conversion apparatus further comprising:
   (c) means for connecting said outlet means of said housing means to said heater means;
   whereby purified water is introduced into said heater means and said heater means provides heated, purified water at a flow rate sufficient to fulfill the demand created by opening said spigot at substantially the same pressure and velocity as provided by a bottled source.

10. The conversion apparatus of claim 1, further comprising:
   (d) cover means for substantially enclosing said conversion apparatus.

11. The apparatus of claim 10, wherein said regulator means is attached to said cove and is flexibly connected to said housing, whereby said cover may be detached without disconnecting said regulator means and said housing.

12. The apparatus of claim 1, wherein said housing is comprised of:
   (a) an upper section; and
   (b) a lower section, a portion of said lower section having a larger cross-sectional area than said upper section.

13. The apparatus of claim 12, wherein said holding chamber means is located within said lower section of said housing.

14. The apparatus of claim 12, wherein said upper and lower sections are substantially cylindrical in cross-section.

15. The apparatus of claim 12, wherein said filter means is substantially disposed within said upper section.

16. The apparatus of claim 12, wherein said inlet and outlet means of said housing are connected to said upper section.

17. The apparatus of claim 12, wherein a portion of said lower section substantially conforms to the shape of said tank.

18. A method for converting a bottled water dispenser to receive water from a continuous source in lieu of a bottled source, said dispenser being of the type having a water tank, said tank being in thermal relationship with refrigeration means and connected to an output tube which is terminated by a spigot, and filter means, whereby chilled water is dispensed upon demand, said conversion method comprising the steps of:
   (a) controlling the input pressure from the continuous water source to provide output source of water at a pressure substantially equal to a bottled source;
   (b) providing a housing, constructed to fit within said tank, said housing being in thermal relationship with said tank;
   (c) connecting said output source to inlet means attached to said housing;
   (d) retaining a volume of chilled water within said housing;
   (e) filtering said volume of chilled water upon demand;
   (f) providing outlet means attached to said housing; and
   (g) connecting said outlet means to said output tube of said bottled water dispenser;
   whereby, said controlled pressure source water is introduced into said housing and chilled, the chilled water is thereafter introduced into said filter means and said filter means provides chilled, purified water at a flow rate sufficient to fulfill the demand created by opening said spigot at substantially the same pressure and velocity as provided by a bottled source.

19. The method of claim 18, wherein said bottled water dispenser further comprises heater means for raising the temperature of water; heater output tube means which is terminated by a spigot, whereby heated water is dispensed upon demand, and wherein said conversion method further comprises the steps of:
   (h) connecting said outlet means of said housing means to said heater means;
   whereby purified water is introduced into said heater means and said heater means provides heated, purified water at a flow rate sufficient to fulfill the demand created by opening said spigot at substantially the same pressure and velocity as provided by a bottled source.

* * * * *